July 24, 1923.

O. OLSON 1,463,020

ADJUSTABLE FISHING LINE BOBBER

Filed March 18, 1922

Inventor
Olaf Olson
By his Attorney
James F. Williamson

Patented July 24, 1923.

1,463,020

UNITED STATES PATENT OFFICE.

OLAF OLSON, OF ST. PAUL, MINNESOTA.

ADJUSTABLE FISHING-LINE BOBBER.

Application filed March 18, 1922. Serial No. 544,772.

*To all whom it may concern:*

Be it known that I, OLAF OLSON, a citizen of the United States, residing at St. Paul, in the county of Ramsey and State of Minnesota, have invented certain new and useful Improvements in Adjustable Fishing-Line Bobbers; and I do hereby declare the following to be a full, clear, and exact description of the invention, such as will enable others skilled in the art to which it appertains to make and use the same.

This invention relates to a float or cork for a fishing line. It is well known to those skilled in the art that it is frequently desirable in fishing to change the position of the float or cork on the line. It has been the common practice to tie the line onto the cork in various ways and to securely hold the same the tying knot must be pulled very tight. After the line gets wet it is very difficult to loosen the knot to move the cork.

It is an object of this invention, therefore, to provide a float or cork for a fishing line having means thereon for holding the line, which means can be quickly and easily operated to loosen the line so that the position of the cork relative thereto may be easily changed.

It is a further object of the invention to provide such a holding means in the line at one end of the cork, which holding means is resiliently operated.

It is most respectfully an object of the invention to provide a fishing float or cork with a clamping means at one end and a spring at the other end for holding the clamping means in position, said spring also forming a means by which the line may be held.

It is a still further object of the invention to provide a clamping means and holding spring all formed of one piece of material.

These and other objects and advantages of the invention will be fully set forth in the following description made in connection with the accompanying drawings in which like reference characters refer to the same parts throughout the different views, and in which—

Figure 1:
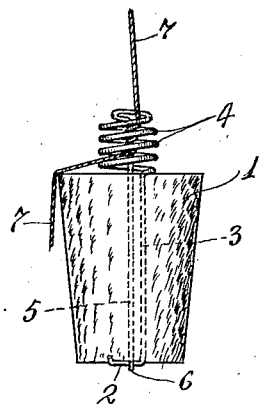
Fig. 1 is a view in side elevation of the device.

Referring to the drawings, the device comprises a body 1 which will be made of some light material such as cork which will readily float upon the water, and which, if made of material heavier than water will contain suitable chambers enabling the same to readily float upon the surface of the water. The device can, as illustrated, be made from a single piece of cork. A piece of comparatively light spring wire is used and one end thereof is bent substantially at a right angle to its length, shown as 2, in position to extend across one end of the body 1 in contact therewith. From this portion 2 a portion 3 extends upwardly through the body 1 and at the other end of said body is formed into a helical spring 4. The convolution of this spring adjacent the top surface of the body 1 and the member 2 act to hold the portion 3 rigidly in a stationary position in said body. The wire at the top of the spring 4 is bent toward the center thereof and again passed downwardly through the body 1 as the portion 5 and this portion is formed with a small hook 6 at its other end and extended across the portion 2. This portion 5 is mounted to slide loosely in the body 1 and is normally pulled upwardly by the spring 4 so that the hook 6 extends over and contacts with the portion 2, as shown in Fig. 1. The body 1 will, of course, be provided with a small aperture to receive the extreme end of the hook.

Figure 2:
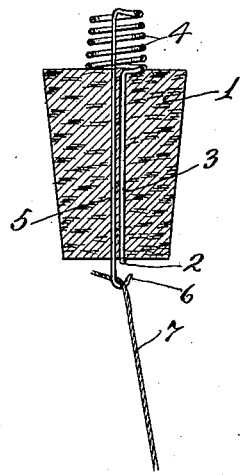
Fig. 2 is a central vertical section thereof.
Figure 3:
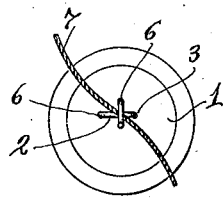
Fig. 3 is a bottom plan view thereof.

In operation, the device will be held in the hand and the spring 4 pressed down with the finger or thumb and the hook 6 will thus be brought to position illustrated in Fig. 2. The line 7, will now be engaged in the hook, as shown in said figure and the spring 4 then released. The spring will pull the hook up against the portion 2 and the line 7 will be clamped between the hook 6 and the portion 2 and held in the desired position relative to the body 1.

When it is desired to release the line, to change its position, the float will merely be held as previously described, the spring downwardly pressed and the line can then be moved along to the desired position and again clamped by releasing the spring 4.

It may be desired to have the line held at both ends of the float, and the spring 4 in addition to operating the clamping means, also forms a simple and effective means for so holding the line. The line will simply be extended up along the side of the cork from the clamping means and given one or more turns about the portion 5 in the spring 4, being wound through the spaces between the convolutions in said spring. In so winding the line about the member 5 and the spring 4, the same should be wound in the same direction as the convolutions of the spring. If wound in the opposite direction of said convolutions, the same may pull out of the spring and away from member 4 if pressure is exerted thereon.

From the above description it is seen that applicant has produced an extremely simple and efficient float or cork having extremely simple and efficient means thereon for holding the line. The body 1 may, of course, be made of any desirable shape. The parts of the device are quite simple and can be very inexpensively made. The efficiency of the device has been amply demonstrated in actual practice.

It will, of course, be understood that various changes may be made in the form, details and proportions and arrangement of the parts without departing from the scope of applicant's invention, which generally stated, consists in the matter shown and described and set forth in the appended claims.

What is claimed is:

1. A fishing bob comprising a float body and a releasable clamping means for the line at one end thereof yieldingly held in clamping position by means at the other end of said float body.

2. A fishing float having in combination, a body adapted to float on the surface of the water, a clamping means for the line at one end thereof and resilient means at the other end thereof for holding the clamping means in line-engaging position and adapted to be operated to release the said clamping means and line.

3. A fishing cork having in combination, a float body, a wire extending through the said body and formed in the clamping means for the line at one end and into a compressible spring at the other end, said spring holding the clamping means at one end in line-engaging position and adapted to be compressed for releasing the clamping means and line.

4. A fishing cork having in combination a float body, a wire extending through the body and having one end extending across one end of the body for a short distance, said wire being formed into a compressible coiled spring at the other end of said body, said portion extending through the body being firmly held therein in stationary position, the upper end of the spring being bent to extend downward therethrough and through said body, being movable in said body and formed with a portion at its lower end adapted to co-operate with said first mentioned portion to form a clamping means for the line.

In testimony whereof I affix my signature.

OLAF OLSON.